United States Patent [19]

Clark

[11] Patent Number: 4,720,637
[45] Date of Patent: Jan. 19, 1988

[54] ELECTRO-OPTICAL IMAGING SYSTEM AND LENS THEREFOR

[75] Inventor: Peter P. Clark, Acton, Mass.

[73] Assignee: Polaroid Corporation, Cambridge, Mass.

[21] Appl. No.: 876,004

[22] Filed: Jun. 19, 1986

[51] Int. Cl.$^4$ .............................................. H04N 9/04
[52] U.S. Cl. ...................................... 250/578; 358/55
[58] Field of Search .................. 250/578, 216; 358/43, 358/44, 55

[56] References Cited

U.S. PATENT DOCUMENTS

| | | | |
|---|---|---|---|
| 3,454,326 | 7/1969 | Schlegel | 350/176 |
| 3,454,327 | 7/1969 | Turula et al. | 350/223 |
| 3,784,734 | 1/1974 | Watanabe et al. | 358/44 |
| 3,987,243 | 10/1976 | Schwartz | 178/6.8 |
| 4,101,929 | 7/1978 | Ohneda et al. | 358/44 |
| 4,178,611 | 12/1979 | Okano | 358/44 |
| 4,227,208 | 10/1980 | Takanashi et al. | 358/55 |
| 4,249,204 | 2/1981 | Masson | 358/55 |
| 4,318,123 | 3/1982 | Knop | 358/43 |
| 4,445,136 | 4/1984 | Shinozaki et al. | 358/55 |
| 4,477,148 | 10/1984 | Tsuji et al. | 350/286 |
| 4,539,584 | 9/1985 | Otake | 358/55 |
| 4,626,897 | 12/1986 | Sato et al. | 358/55 |

Primary Examiner—David C. Nelms
Assistant Examiner—Stephone B. Allen
Attorney, Agent, or Firm—Francis J. Caufield

[57] ABSTRACT

An electronic imaging system includes an optical system for imaging radiation from a scene onto the image sensing surface of an imaging device for a selected sample period. The imaging device may take the form of a two dimensional array of photoresponsive areas having a device specific upper spatial frequency limit. In order to eliminate alias signal components in the output video signal caused by spatial frequency components in the scene radiation greater than the Nyquist spatial frequency of the device, the optical system is designed to have a spatial frequency limit no higher than the Nyquist frequency of the imaging device and thus functions as a low pass optical filter. The spatial frequency response of the optical components can be controlled by controlling the rotationally symmetric aberrations, and in the preferred form, higher order terms, third and above, which contribute to the spherical aberration of a lens system are designed to have balancing non-zero values to provide the necessary characteristics of the modulation transfer function of the optical system.

4 Claims, 11 Drawing Figures

ELECTRO-OPTICAL IMAGING SYSTEM AND LENS THEREFOR

BACKGROUND OF THE INVENTION

The present invention relates to electronic imaging apparatus and methods. More particularly, it concerns apparatus and methods for forming optical images of a scene on electronic devices that convert the optical image irradiance falling on them to an electronic output signal that faithfully represents the scene with a minimum of ambiguity in the final reconstituted image.

In electronic imaging systems, radiation reflected from a scene is imaged on the photosensing surface of the electronic imaging device. In television imaging systems, an optical system directs scene radiation into a vidicon tube to present the scene image at a photoconductive target surface located at an image plane. The target surface is electronically charged to a local charge level by the imaged irradiance pattern of the scene which is proportional to the corresponding local radiance of the scene. The target is scanned in a raster pattern by an electron beam to provide an output signal which electrically represents the target surface charge pattern caused by the imaged scene irradiance. In this way, a continuous real time electrical replica of the scene radiation is generated for subsequent use.

Semiconductor imaging devices suitable for use in hand-held still cameras include various types of monolithic and hybrid area imaging photoresponsive sensors such as charged coupled devices (CCDs) and photodiode arrays. In a CCD area imaging sensor, a two dimensional metal insulator semiconductor (MIS) substrate is formed from a semiconductor material with a series of electrodes formed on one surface. The opposite image receiving surface is exposed to scene irradiance to create and store packets of photogenerated charges in the substrate. After a suitable sampling interval, the charge packets are transferred in a sequential step-wise manner to an output device to provide an electrical signal representative of the sampled scene. In addition to area imaging devices, linear arrays, or even a single detector, can be used with devices which scan the scene across the array to provide a corresponding video signal representative of the scene.

In the fabrication of semiconductor image sensing arrays, the number of photosensitive areas or "pixels" which can be provided per unit area is limited by practical material and fabrication considerations. Because the number of pixels is limited, the ability of such devices to resolve spatial detail in an image is correspondingly limited. The image producing quality of an imaging device is oftentimes expressed in terms of its modulation transfer function (MTF), the ratio of modulation in the image to that in the object. Generally, the higher the value of the MTF with spatial frequency, the better it will resolve spatial detail in an object. All such devices, however, have a practical spatial frequency limit at which their modulation transfer function value drops to an unacceptably low value. To put it in other terms, the electrical output signal of an imaging device can be expressed as a Fourier transform. Ideally, the electrical transform provided by the imaging device is an exact analog of the corresponding transform which describes the two dimensional flux density distribution at the image plane as provided from the scene. When an electrical imaging device that periodically samples a scene containing spatial frequency components much higher than the Nyquist frequency of the device, the frequency components above the Nyquist frequency limit of the device will in reconstruction appear as spurious lower frequency components. These spurious components are known as "aliases" and are defects in the electrical output signal. While aliasing can be controlled by providing devices having higher sampling rate, the aliasing effect limits the ultimate picture taking ability of an electronic imaging camera.

A principal objective of the present invention is, therefore, the provision of an improved electronic imaging system for providing an electrical signal which faithfully represents a scene with a minimum of imperfections caused by high frequency components in the scene radiation. Other objects and further scope of applicability of the present invention will become apparent from the detailed description to follow, taken in conjunction with the accompanying drawings, in which like parts are designated by like reference characters.

SUMMARY OF THE INVENTION

In accordance with the present invention, an electronic imaging system is provided in which an optical subsystem images a scene onto the image receiving surface of a sensing device so that aliasing effects in the electrical output signal of the sensing device are minimized. The optical subsystem is configured to have a spatial frequency response that reduces scene frequencies that are greater than the Nyquist frequency of the electrical imaging device over a range of apertures. As a result, generation of alias components in the electrical output signal is prevented.

In the preferred form of the invention, the optical components are designed so that rotationally symmetric aberrations of the components balance for a range of apertures to attenuate transmission of spatial frequency components above a predetermined limit to the imaging device. Preferably third, fifth and higher order spherical aberrations of the optics by design are balanced such that the MTF is low above the Nyquist frequency for a wide range of apertures at best focus. In this way, the optical subsystem acts as a low pass optical spatial filter. The invention can be implemented by specifically designing the optical components with the spherical aberration contributions balanced as required or by adding to an existing well-corrected optical system an additional refracting element having characteristics for providing the desired effect.

BRIEF DESCRIPTION OF THE DRAWINGS

FIG. 1A is an enlarged diagrammatic plan view of a portion of the photosensitive areas of the electronic imaging device of FIG. 1;

FIG. 4 is a graphical representation of the normalized geometric modulation transfer function plotted against spatial frequency for a first aperture setting;

DESCRIPTION OF THE PREFERRED EMBODIMENT

Figure 1:
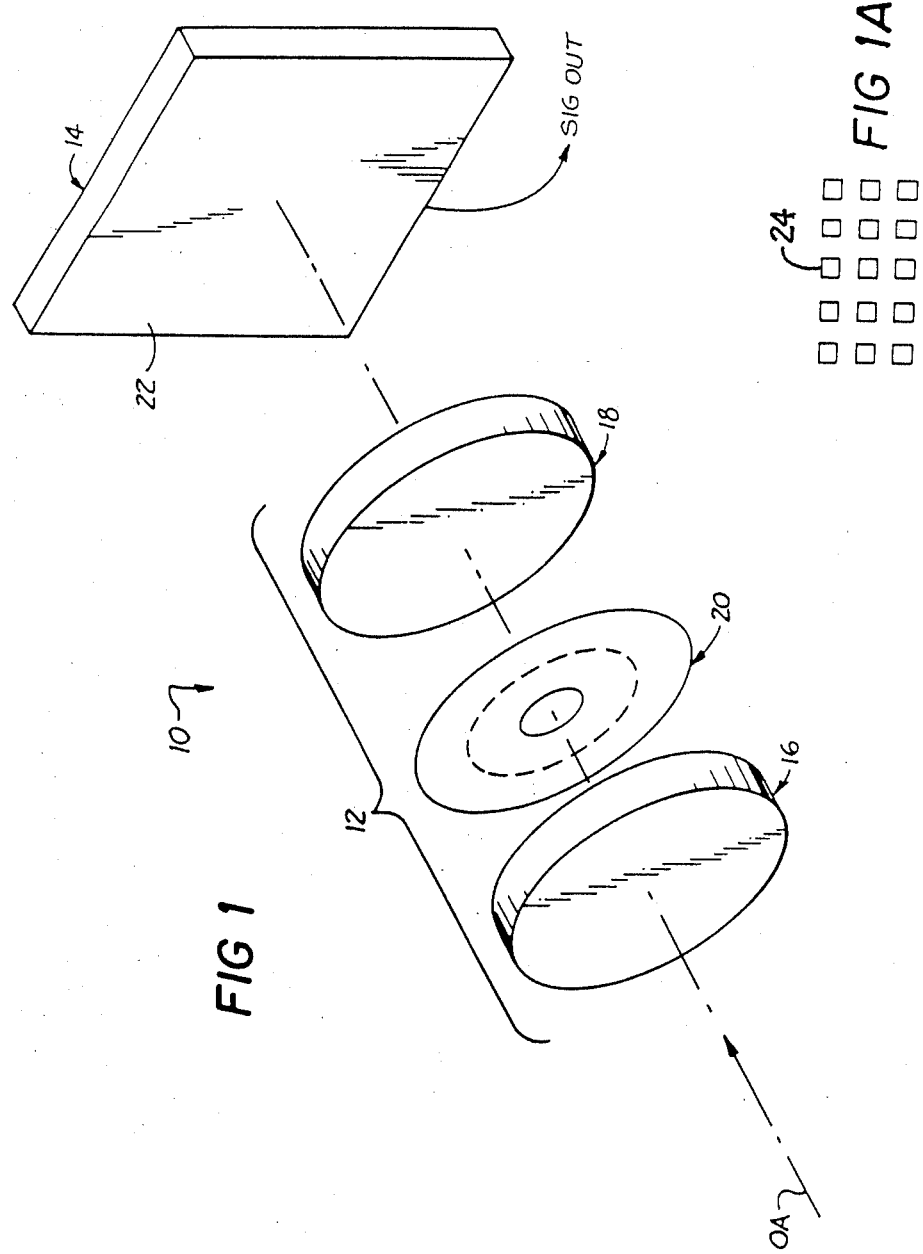
FIG. 1 is a diagrammatic perspective of an imaging system in accordance with the present invention, including optical components and an electronic imaging device onto which scene radiation is imaged.

A representative electro-optical system in accordance with the present invention is shown in schematic form in FIG. 1 and is designated generally by the reference character 10. As shown, the electro-optical system 10 includes an optical component section 12 aligned along an optical axis OA for imaging radiation from a scene onto an image sensor 14. The optical component section 12 includes schematically represented lenses or lens groups 16 and 18 and a controllable aperture 20 which can be controlled to provide any one of a plurality of light admitting openings throughout an aperture range, as indicated generally by the solid line and dotted line representations in FIG. 1. The lenses 16 and 18 of FIG. 1 have been shown in generalized and schematic form since any optical system having designer controlled parameters, including the number and shape of the object and image side refracting surfaces, the spacing between refracting surfaces, and a range of refraction properties can be used to practice the present invention. In general, the optical component section 12 must have a minimum of two refracting surfaces, for example, as represented by the object side and image side refracting surfaces of the lens 16, although the illustrated lenses 16 and 18 can be representative of more complex lens arrangements such as objectives of form triplet or Tessar.

The image sensor 14 is formed as a two dimensional planar substrate having an area imaging surface 22 upon which radiation from the scene is imaged by the optical component section 12. The image sensor 14 can take various forms including, as shown in FIG. 1A, a regular array or mosaic of photosensitive areas or elements 24 which are each uniquely responsive to the irradiance provided from the scene through the optical component section 12 with the image sensor 14 providing in a well-known way a corresponding electronic signal, SIG OUT. In FIGS. 1 and 1A, the image sensor 14 and its photosensitive elements 24 have been shown in enlarged scale for the purpose of illustration. In the preferred form, the image sensor 14 is a charged coupled device (CCD) having a rectangular array of photosensitive areas 24. In addition to imaging devices having an area imaging surface 22, other imaging devices can be used including linear arrays, or even a single detector, which can periodically scan scene radiation with appropriate scanning apparatus (not shown) to provide a corresponding electronic output signal.

Figure 2:
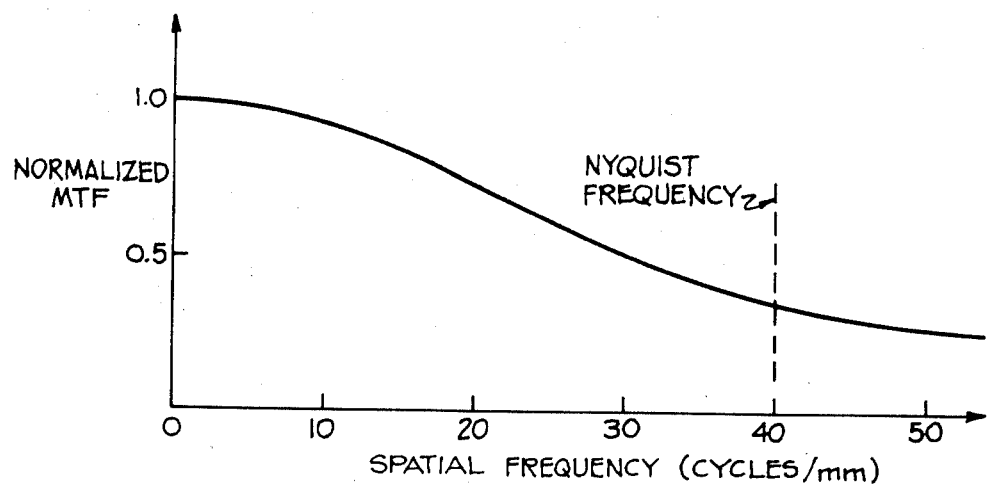
FIG. 2 is an idealized graphical representation of normalized modulation transfer function plotted against spatial frequency.

In operation, the optical component section 12 images scene radiation onto surface 22 for a predetermined sample period with the electronic signal presented during a post sampling period. The radiation imaged onto the image sensor 14 has a two dimensional flux density distribution which generally can be described in mathematical terms by a Fourier transform which includes its spatial frequency components. The image sensor 14 functions to convert the imaged scene radiation into an electrical signal that likewise can be described in mathematical terms by a Fourier transform. The spatial frequency response of the image sensor 14 to detail in the imaged scene radiation conveniently can also be described in terms of its modulation transfer function relative to its spatial frequency response (cycles/mm). By comparing the spatial frequency content in a scene with the response of the sensor, one can determine the finest detail seen by the sensor at some acceptable contrast level. As shown by the solid line curve in FIG. 2, an image sensor can have a modulation transfer function of nearly one for very low spatial frequencies with the modulation transfer function dropping with increased spatial frequencies to a device specific upper limit, such as 50 cycles/mm or so for exemplary devices used in the preferred embodiment. When an electrical image sensor having a selected spatial frequency upper limit is irradiated with scene radiation having spatial frequency components higher than that of the Nyquist limit of the device, say 40 cycles/mm, the electrical output signal of the device contains false signal components or aliases which result in defects, distortions or other ambiguities in the reconstructed image of the scene. The Nyquist frequency will be understood to be $\frac{1}{2}P$ for regular arrays where P is the separation of the individual detectors.

In order to prevent alias components in the electrical output signal of the image sensor 14, the optical component section 12 is provided with a spatial frequency response, that is, an upper spatial frequency limit, which is substantially equivalent to and preferably no higher than the Nyquist frequency limit of the image sensor 14 to prevent spatial frequency components in the scene, which are higher than the Nyquist spatial frequency limit of the image sensor 14, from irradiating the image surface 22.

In accordance with the present invention, the rotationally symmetric aberrations of the optical components are made to oscillate in value with increased aperture to cancel one another with changes over the aperture range. Preferably, spherical aberrations of the optical components are balanced so that the third, fifth and higher order spherical aberration contributions limit the spatial frequency response of the optical components independent of aperture and without substantially shifting plane of best focus.

Figure 3:
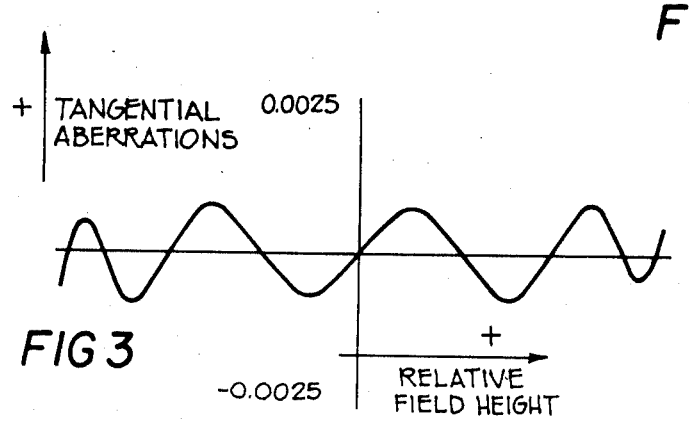
FIGS. 3 and 4 are qualitative graphical representations of the variation in spherical aberration with aperture for an exemplary lens system.
Figure 4:
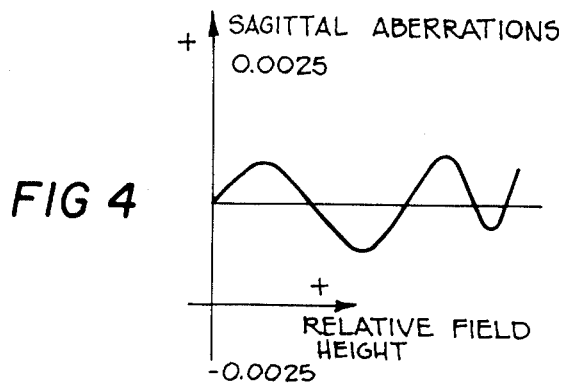

As shown in a qualitative manner in FIGS. 3 and 4, the spherical aberration, both tangential and spatial, at the optical axis, OA, is zero with the aberration increasing in an equal, opposite, and periodic manner with aperture as represented by the relative field height. The spherical aberration is essentially linear at and immediately adjacent the optical axis, OA, and oscillates in value in a periodic manner as aperture increases.

Figure 5:
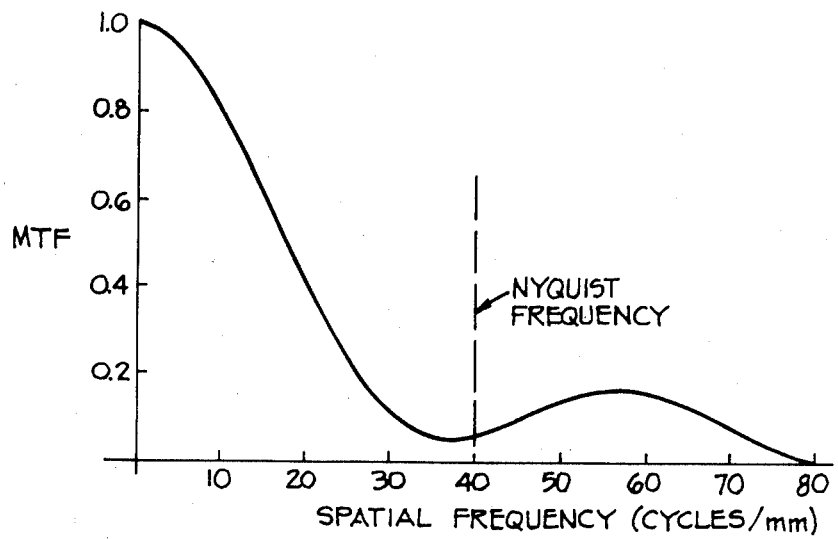
FIG. 5 is a graphical representation of the normalized geometric modulation transfer function plotted against spatial frequency for a second aperture setting.
Figure 6:
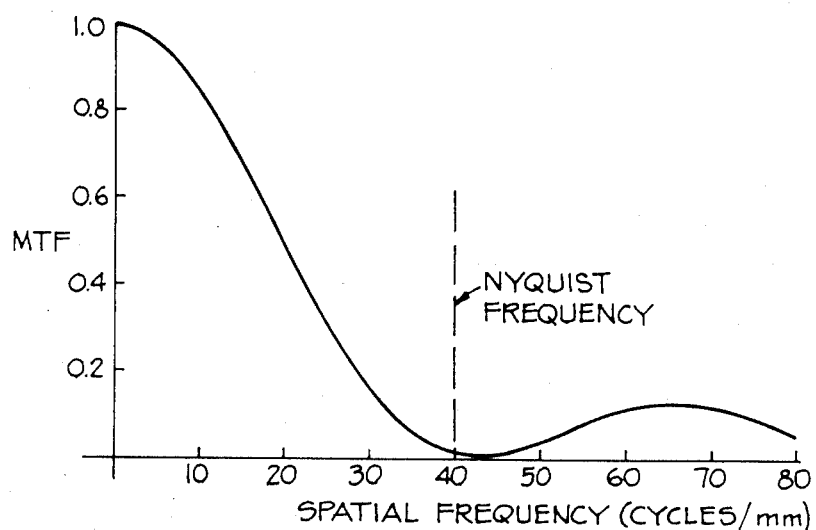
FIG. 6 is a graphical representation of the normalized geometric modulation transfer function plotted against spatial frequency for a third aperture setting.
Figure 7:
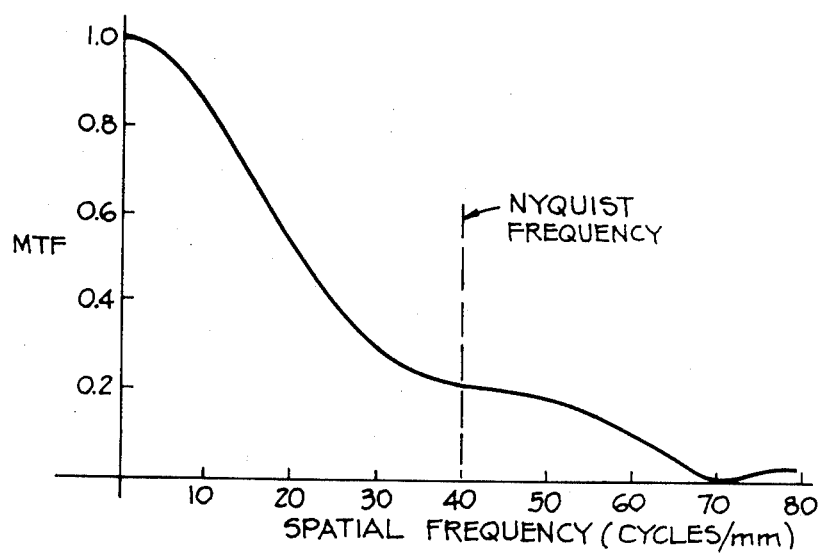
FIG. 7 is a graphical representation of the normalized geometric modulation transfer function plotted against spatial frequency for a fourth aperture setting.
Figure 8:
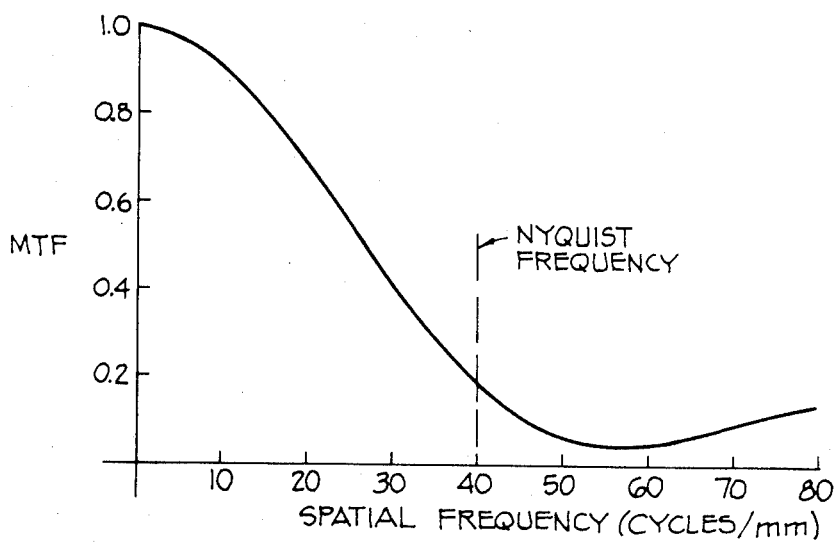
FIG. 8 is a graphical representation of the normalized geometric modulation transfer function plotted against spatial frequency for a fifth aperture setting.
Figure 9:
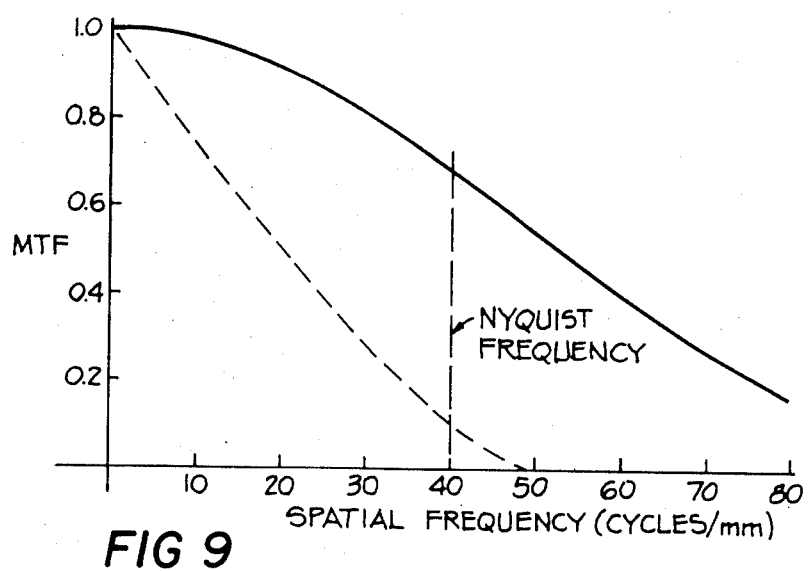
FIG. 9 is a graphical representation of the normalized geometric modulation transfer function plotted against spatial frequency for a sixth aperture setting shown along with the diffraction modulation transfer function for the same system.
Figure 10:
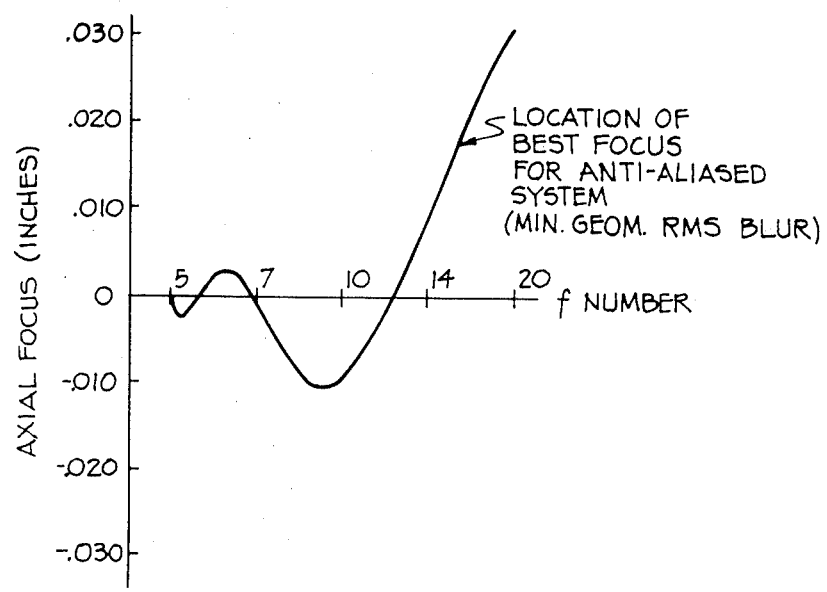
FIG. 10 is a graphical representation of the variation in the location of best focus with aperture for an exemplary lens system.

The spatial frequency response characteristics for an optical system provided with the spherical aberration characteristics or profiles with aperture as shown in FIG. 3 are illustrated in FIGS. 5-9. In FIG. 5, which represents an aperture setting of f/5, the modulation transfer function is one or nearly one at very low spatial frequencies and drops smoothly to about 35 cycles/mm. This spatial frequency profile which is low near the Nyquist frequency of the electronic image sensor 14 assures that higher spatial frequency components in the scene are not passed by the optical components to the image sensor 14. In FIG. 6, in which an aperture setting of f/7 is specified, the spatial frequency response closely corresponds to that of FIG. 5 except that the modulation transfer function at 40 cyles/mm is lower than that in FIG. 5. In FIG. 7, which represents an aperture setting of f/10, the modulation transfer function is again one or nearly one at low spatial frequencies and drops smoothly down to approximately 0.2 at 40 cycles/mm. FIG. 8 shows the MTF for the system at f/14. Here again, the value is 0.2 at 40 cycles/mm. In FIG. 9, which is for f/20, the diffraction MTF (dotted line) dominates because of the small aperture and cuts off near 40 cycles/mm. The MTF of the optical system 12 needn't cut-off sharply at the Nyquist frequency, but can continue to pass frequencies above it at some level of contrast provided the product of the MTFs of the optical system and the detector effectively limit the scene frequencies above the Nyquist limit.

As the aperture of the system varies, the axial location of the plane of best focus varies as shown by the curve. Even though the location of the plane of best focus changes, the range is kept well within the acceptable focus limits so that the image remains sharp with variations in aperture.

As can be appreciated from a consideration of the above, control of the spherical aberration profile of the lens system eliminates or greatly attenuates the higher frequency spatial components in the scene radiation to prevent or minimize the formation of undesired alias components in the electrical output signal of the image sensor.

In carrying forth the invention, an optical system can be designed having the desired aberration control, or, more preferably, an existing well-corrected lens system can be modified by introducing an additional optical component having controlled aspheric surfaces which alter the overall aberration profile to provide the desired result. This optical component may take on various shapes as required by the characteristics of the other elements in a well-corrected lens and is best placed at the aperture stop location. In shape, it will be a higher order symmetric polynomial curve as required. The shape is best arrived at in a well-known way utilizing conventional computational routines to optimize for the coefficients of the polynomial such that the blur size and focus are independent of aperture.

The following prescription is an example of an optical system that will produce the MTF characteristics described hereinabove:

A thin plate of glass (n=1.5185) is placed at the aperture stop of a well-corrected optical system. The diameter of the aperture stop is 2.00 inches. The first surface of the glass plate is plane, the second surface is described by the following polynomial:

$$Z(r) = C_2 r^2 + C_4 r^4 + C_6 r^6 + C_8 r^8 + C_{10} r^{10}$$

where $Z(r)$ is surface sag from its vertex, $r = (X^2 + Y^2)^{\frac{1}{2}}$, radial distance from the axis, and the coefficients are as follows:

$C_2 = 0.0006479$
$C_4 = -0.004461$
$C_6 = 0.010897$
$C_8 = -0.010852$
$C_{10} = 0.0038571$

Thus, it will be appreciated from the above that as a result of the present invention, a highly effective electronic imaging apparatus and method is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. An electro-optical imaging system comprising:
   an electronic image sensor responsive to radiation from a scene for producing an electrical output signal corresponding to scene radiation imaged thereon, said electronic image sensor having a Nyquist spatial frequency limit; and
   a lens for imaging scene radiation onto said electronic image sensor, said lens having rotationally symmetric aberrations over a range of apertures thereof for limiting its spatial frequency response over said range of apertures to a spatial frequency limit substantially equal to said Nyquist limit of said electronic image sensor to substantially eliminate undesirable image patterns due to aliasing.

2. The electro-optical imaging system of claim 1 wherein said lens has spherical aberrations controlled by third, fifth and higher order terms, said third, fifth and higher order terms controlled to balance one another for said range of apertures.

3. A lens for imaging radiation from a scene onto an image sensor having a given Nyquist spatial frequency response limit, said lens comprising:
   at least first and second refracting surfaces aligned along an optical axis for imaging radiation from a scene onto the image sensor, said first and second refracting surfaces having rotationally symmetric aberrations controlled to limit said lens' spatial frequency response to that of the image sensor over a range of apertures to substantially eliminate undesirable image patterns due to aliasing.

4. The optical imaging apparatus of claim 3 wherein said first and second refracting surfaces have spherical aberrations controlled by third, fifth and higher order aberration terms, the third and fifth order terms controlled to balance one another for said range of apertures.

* * * * *